US008397163B1

(12) United States Patent
Sran

(10) Patent No.: US 8,397,163 B1
(45) Date of Patent: Mar. 12, 2013

(54) DEVICE, METHOD, AND SYSTEM FOR PROVIDING AN ELECTRONIC READING ENVIRONMENT

(76) Inventor: Deep Sran, Chevy Chase, MD (US)

( * ) Notice: Subject to any disclaimer, the term of this patent is extended or adjusted under 35 U.S.C. 154(b) by 2513 days.

(21) Appl. No.: 09/928,557

(22) Filed: Aug. 13, 2001

Related U.S. Application Data

(60) Provisional application No. 60/225,367, filed on Aug. 14, 2000.

(51) Int. Cl.
*G06F 3/00* (2006.01)
*G06F 3/048* (2006.01)

(52) U.S. Cl. ........ 715/712; 715/713; 715/853; 715/854; 715/204; 715/207

(58) Field of Classification Search ................ 345/853, 345/854, 855, 738, 739, 712; 715/513, 514, 715/853–855, 738, 739, 712, 500, 505, 506, 715/512, 530, 515, 501.1, 713, 204, 207; 707/104.1, 104
See application file for complete search history.

(56) References Cited

U.S. PATENT DOCUMENTS

| | | | | |
|---|---|---|---|---|
| 5,220,657 A * | 6/1993 | Bly et al. | ...................... | 711/152 |
| 5,392,428 A * | 2/1995 | Robins | ............................... | 707/3 |
| 5,671,428 A * | 9/1997 | Muranaga et al. | ............ | 715/751 |
| 5,694,594 A * | 12/1997 | Chang | .............................. | 707/6 |
| 5,819,301 A * | 10/1998 | Rowe et al. | .................... | 715/513 |
| 5,870,768 A * | 2/1999 | Hekmatpour | ............... | 715/501.1 |
| 5,884,301 A | 3/1999 | Takano | ............................. | 707/3 |
| 5,903,889 A * | 5/1999 | de la Huerga et al. | ............ | 707/3 |
| 5,920,859 A | 7/1999 | Li | ................................... | 707/5 |
| 5,933,140 A | 8/1999 | Strahorn et al. | ............. | 345/712 |
| 5,956,034 A * | 9/1999 | Sachs et al. | ................... | 715/776 |
| 5,970,472 A | 10/1999 | Allsop et al. | .................... | 705/26 |
| 6,003,046 A | 12/1999 | Nielsen | ......................... | 715/513 |
| 6,018,344 A | 1/2000 | Harada et al. | ................. | 345/818 |
| 6,027,024 A | 2/2000 | Knowles | ........................ | 235/472 |
| 6,029,135 A * | 2/2000 | Krasle | .......................... | 704/275 |
| 6,035,330 A | 3/2000 | Astiz et al. | .................... | 709/218 |
| 6,052,676 A | 4/2000 | Hekmatpour | ................... | 706/11 |
| 6,065,048 A | 5/2000 | Higley | ........................ | 709/218 |
| 6,075,537 A | 6/2000 | Adapathya et al. | ........... | 345/760 |
| 6,076,733 A | 6/2000 | Wilz, Sr. et al. | .............. | 235/462 |
| 6,088,515 A | 7/2000 | Muir et al. | ..................... | 709/217 |
| 6,092,074 A | 7/2000 | Rodkin et al. | ................ | 707/102 |
| 6,098,091 A | 8/2000 | Heidorn et al. | ............ | 715/501.1 |
| 6,101,503 A * | 8/2000 | Cooper et al. | ............. | 707/104.1 |
| 6,105,044 A * | 8/2000 | DeRose et al. | ................ | 715/514 |
| 6,122,647 A * | 9/2000 | Horowitz et al. | ............. | 715/513 |
| 6,138,129 A * | 10/2000 | Combs | .................................. | 707/6 |
| 6,154,757 A * | 11/2000 | Krause et al. | ................. | 715/530 |
| 6,189,019 B1 * | 2/2001 | Blumer et al. | ................ | 715/513 |
| 6,237,006 B1 * | 5/2001 | Weinberg et al. | ......... | 707/103 R |

(Continued)

OTHER PUBLICATIONS

Pedersen et al., "Tivoli: An Electronic Whiteboard for Infoamal Workgroup Meetings," pp. 391-398, 1993 ACM.*

(Continued)

*Primary Examiner* — Tadeese Hailu
(74) *Attorney, Agent, or Firm* — McDonnell Boehnen Hulbert & Berghoff LLP

(57) ABSTRACT

A device, method, and system for providing an electronic reading environment are described herein. The device, method, and system convert standard electronic text into a hyper-text document. The hyper-text document transforms standard electronic text into access points that allow a reader to further explore each word, group of words, or image in the hyper-text document. Navigational aids and features assist in combining the advantages of paper-based and electronic-based text into one electronic reading environment for reading any electronic text.

23 Claims, 8 Drawing Sheets

U.S. PATENT DOCUMENTS

| | | | |
|---|---|---|---|
| 6,279,014 B1 * | 8/2001 | Schilit et al. | 715/512 |
| 6,470,383 B1 * | 10/2002 | Leshem et al. | 709/223 |
| 6,539,387 B1 * | 3/2003 | Oren et al. | 1/1 |
| 6,551,357 B1 * | 4/2003 | Madduri | 715/512 |
| 6,567,830 B1 * | 5/2003 | Madduri | 715/512 |
| 6,587,895 B1 * | 7/2003 | Golovchinsky et al. | 710/12 |
| 6,658,623 B1 * | 12/2003 | Schilit et al. | 715/513 |
| 6,721,410 B1 * | 4/2004 | Will | 379/202.01 |
| 6,741,268 B1 * | 5/2004 | Hayakawa | 715/777 |
| 6,766,494 B1 * | 7/2004 | Price et al. | 715/513 |
| 6,877,137 B1 * | 4/2005 | Rivette et al. | 715/512 |
| 6,952,806 B1 * | 10/2005 | Card et al. | 715/802 |
| 7,233,950 B2 * | 6/2007 | Smith, III | 1/1 |
| 2002/0010707 A1 * | 1/2002 | Chang et al. | 707/500 |
| 2002/0174145 A1 * | 11/2002 | Duga et al. | 707/513 |

OTHER PUBLICATIONS

Jakob Nielsen, "The Art of Navigating through HyperText," pp. 298-310, Mar. 1990, ACM.*

Jamey Graham, "The Reader's Helper: A personalized Document Reading Environment," pp. 481-628, 1999, ACM.*

Gustavo Rossi et al., "Patterns for Designing Navigable Infomation Spaces," 1998.*

Schilit et al., "Beyond Paper:Supporting Active Reading with Free Form Digital Ink Annotation," pp. 1-8, CHI 1998.*

Zizi et al., "Hypermedia Exploration with Interacive Dynamic Maps," pp. 1-24, 1995.*

Roy Rada, University of Liverpool, Converting a Textbook to Hypertext, ACM Transactions on Information Systems, vol. 10 No. 3, Jul. 1992, pp. 294-315.*

U.S. Appl. No. 60/225,367, filed Aug. 24, 2000, Sran.

H. Strang, et al., "LearningLinks: A Visual Basic Tool for Developing Hypermedia Learning Experiences", www.coe.uh.edu/insite/elec_pub/HTML1997/nm_stra.htm, printed Jul. 31, 2000 (5 pages).

Dario Lucarella, "A Model for Hypertext-Based Information Retrieval", In Proceedings of the European Conference on Hypertext—ECHT 90, pp. 81-94, Cambridge, United Kingdom, 1990, Cambridge University Press (14 pages).

Gary Marchionini, "Information-Seeking Strategies of Novices Using a Full-Text Electronic Encyclopedia", *Journal of the American Society for Information Science*, 40(1):54-66, 1989 (13 pages).

E. Carmel, et al., "Browsing in Hypertext: A Cognitive Study", *IEEE*, vol. 22, No. 5, Sep./Oct. 1992 (19 pages).

S. Mukherjea, et al., "Interactive Clustering for Navigating in Hypermedia Systems", ECHT '94 Proceedings, Sep. 1994 (10 pages).

A. Herhoeven, et al., "External Navigation Control and Guidance for Learning with Spatial Hypermedia", www-jime.open.ac.uk/99/1/verhoeven-99-1-paper.html, printed Nov. 6, 2001 (38 pages).

Linton Weeks, "Banking Big on e-Literacy", www.washingtonpost.com/wp-dyn/articles/A46563-2000Aug6.html, published Aug. 6, 2000, printed Nov. 6, 2001 (3 pages).

J. M. Ewing, et al., "Learning using the World Wide Web: a collaborative learning event", *Journal of Educational Multimedia and Hypermedia*, vol. 8, No. 1, pp. 3-22. www.northern-college.ac.uk/departments/educational_studies/JimEwing/Learning_using_WWW.html, printed Nov. 6, 2001 (16 pages).

A. Fuchs, et al., "Introduction to Web-Based Instruction: Module P6", www.quasar.ualberta.ca/edmedia/TIES/P6.html, printed Nov. 6, 2001 (6 pages).

C. Seeberg, et al., "Individual tables of Contents in Web-based Leaning Systems", Proceedings of the 10th ACM Conference on Hypertext and Hypermedia, www.kom.e-technik.tu-darmstadt.de/publications/abstracts/SSR+99-2.html, printed Nov. 6, 2001 (1 page).

"techexplorer: Hypermedia Browser", www-4.ibm.com/software/network/techexplorer/, printed Nov. 6, 2001 (2 pages).

"Hypersoft: Open hypermedia and Tutor", www.hypersoft-net.com/Def-eng.htm, printed Nov. 6, 2001 (2 pages).

"Welcome to HyperMedia Corporation's World-Wide Web Server", HyperMedia Corporation, www.walden3d.com/hmc/hypermedia1.html, printed Nov. 6, 2001 (2 pages).

M. Bieber, et al., "Fourth Generation Hypermedia: Some Missing Links for the World Wide Web", *International Journal on Human Computer Studies*, 47, Academic Press, 1997, p. 31-65, www.cs.unibo.it/~fabio/bio/papers/1997/IJHCS97/issues57.html, printed Nov. 6, 2001 (30 pages).

I. Wesley-Tanaskovic, et al., "Expanding Access to Science and Technology: The Role of Information Technologies", *Proceedings of the Second International Symposium on the Frontiers of Science and Technology*, Held in Kyoto, Japan, May 12-14, 1992, www.unu.edu/unpress/unupbooks/uu07ee00.htm, printed Nov. 6, 2001 (7 pages).

M. Fischinger, et al., "Easy: A Hypermedia Learning Tool", *Department of Civil and Geodetic Engineering*, University of Ljubljana, Slovenia, Oct. 1998. www.itcon.org/1998/1/paper.htm, printed Nov. 6, 2001 (10 pages).

R. Zeiliger, et al., "Concept-Map based Navigation in Educational Hypermedia: A Case Study", Groupe d'Analyse et de Théorie Economique, Université Lyon. www.irpeacs.fr/~zeiliger/ARTEM96.htm, printed Nov. 6, 2001 (5 pages).

R. Jensen, "Checklist of Hypermedia Designs for Interactive Media in Education", Trinity University, San Antonio, Texas. www.trinity.edu/~rjensen/ideasmm.htm, printed Nov. 6, 2001 (11 pages).

H. Davis, et al., "A Framework for Delivering Large-Scale Hypermedia Learning Material", University of Southampton. www.bib.ecs.soton.ac.uk/data/1330/html/html/, printed Nov. 6, 2001 (7 pages).

O. Nyskänen, et al., "A Design for Hypermedia Based Learning Environment", Tampere University of Technology, Finland, May 2, 1997. www.matwww.ee.tut.fi/~alaranta/sozopol/hble.html, printed Nov. 6, 2001 (11 pages).

* cited by examiner

DEVICE, METHOD, AND SYSTEM FOR PROVIDING AN ELECTRONIC READING ENVIRONMENT

REFERENCE TO RELATED APPLICATION

This patent application claims priority to the U.S. provisional patent application Ser. No. 60/225,367, filed Aug. 14, 2000, entitled "Method and System For an Improved Hyper-Media Environment," the contents of which are incorporated by reference herein.

FIELD OF THE INVENTION

The present invention relates in general to electronic reading systems and methods.

BACKGROUND OF THE INVENTION

Knowledge is typically acquired by study, investigation, observation, or experience. Fortunately, knowledge is often recorded in one form or another, often as text or as images, so that people can use the knowledge and build upon it in the present and in the future, primarily by reading or visualizing. Given that knowledge is connected and interrelated, it may be said that behind any textual or visual information lies the entire body of human knowledge. This canon is of no use, however, if the knowledge is not readily accessible, manageable and expandable, or if the information does not answer or appeal to the current interests and needs of the reader.

This observation is true whether the reader is a kindergarten student learning about fascinating geometric shapes and colors, an accomplished scientist reading the latest scientific journal, a middle school student attempting to read his or her first classic novel, or a history student interested in the French Revolution. Of course, this list of examples could go on indefinitely, but unique and specific to each individual reader or user of knowledge are certain interests and ways of accessing knowledge, as well as a unique body of background knowledge. Additionally, although the human mind has great potential for learning, imagination, and creativity, it also has significant limitations. Research in education, cognition, and neuroscience suggest that there are boundaries on what the mind can do, and there are specific ways in which the mind most efficiently seeks and assimilates knowledge. Therefore, information or knowledge is of little use unless it is readily accessible to, appeals to the interests of, and connects with the existing knowledge of the individual reader at the present moment.

Unfortunately, knowledge is not always accessible, or might be accessible but is difficult to understand. Until very recently, the only way to access and assimilate information was to read paper-based resources such as text on paper or some other medium (e.g., a blackboard or overhead projector). Consequently, bookstores and libraries were erected to make accessible a multitude of paper-based resources to the general public, businesses, and those in academia. Exemplary resources offered by book stores and libraries are topical books, encyclopedias, journals, magazines, and so on where each resource provides paper-text-based reading.

Typically paper-based reading allows one to read comfortably, to quickly navigate or flip between pages, to view an entire page of high-resolution text, to underline, write comments and draw images on the page, and to quickly access the table of contents and index to discern the organization of the text and location of specific contents. Yet, with paper-based reading, the reader cannot access from a paper-based resource any more information than was provided by the author(s) of that resource. For example, the author might refer to an unfamiliar or interesting term or concept, and a curious reader would have to leave the original source and retrieve other paper-based resources to supplement the original paper-based reference; this is not convenient or likely to be done, even if the additional information would expand the reader's understanding or appreciation of the original text, and in so doing expand the reader's body of knowledge. Even using today's large book stores, expansive libraries, and electronic information resources and databases, researching and exploring new and relevant information and references cannot be done optimally, in a way that allows readers to reach the world beyond their original information efficiently. In most cases, supplemental information cannot be easily located, accessed, managed, assimilated or used because of the limitations of paper-based-texts and existing electronic reading devices, methods, or systems.

To deal with the ever-expanding body of human knowledge and the related issues concerning the accessibility of this canon, people have come to increasingly rely on computer technology and electronic reading. Because of the access and speed made possible with electronic-based reading and searching tools, more and more paper-based resources are being converted into electronic format or being replaced with computer technology. Now, if a reader needs to access information in electronic format, they can simply perform an electronic search by using a computer at one location that is connected to a network such as the Internet or a local area network (LAN). Unfortunately, while computer technology and networks like the Internet make accessing and searching vast amounts of information more efficient, they still have significant shortcomings. For example, typing a keyword into a present-day search engine can yield an unmanageable number of hits or matches, of varying relevance and reliability. Such search results can be too difficult to work with, and among other things can leave the reader with a cognitive burden, also referred to as cognitive load.

Cognitive load is the difficulty of not only paying attention to the content of electronic documents, but keeping track of the links and locations between them. Not only does the user expend cognitive resources processing content, but also storing information with respect to the location of the current electronic document, the path taken to the present location, the path back to the original link, and the conceptual connections between the content in each node.

Similarly, disorientation refers to the increased likelihood that a reader is going to lose sense of where they are in the electronic document. Thus readers forget what they have explored and what they have not, and how relevant and important what they have explored is. Electronic documents often lack the linearity and navigational aids of conventional books, including pages that run in order, page numbers, a table of contents, and an alphabetical index. Moreover, by handling a physical book and pages, a reader knows how long the book is and how far they have progressed, whereas an electronic document often reveals little or nothing about its overall size or organization. These differences impair a user's ability to efficiently navigate an electronic document.

Another consequence of increased cognitive load in typical electronic-based environments is cognitive inertia, which describes a reader's pattern of accepting system defaults and minimal levels of system complexity or failure to make use of all of the environment's or system's features, as a means to reduce cognitive load. As a result, the provision of a diversity of features to improve user access to information in an electronic-based-document, which is one of the advantages of computer-based learning environments when compared to printed texts, may not actually benefit users because they are unlikely to use these features in an effort to limit cognitive effort.

Another design consideration in connection with cognitive load relates to the selection and definition of access points or links in an elecironic-based-document. If users are permitted to jump from anywhere to anywhere in hypertext, the result can be "hyperchaos." Hyperchaos is at the opposite extreme from a predetermined "linear sequence of screens with no deviation possible." Like cognitive inertia, hyperchaos is an example of how the cognitive cost of additional features, access points, or paths may undermine their utility. Too many choices or features can lead to distraction. In other words, electronic-based documents can be too free form. Some readers can easily become confused and unfocused if left entirely unguided in a hypermedia environment. For other readers, however, too many restrictions in a hypermedia environment are not constructive.

Current electronic resources, including search engines and information databases, might allow a reader to access and search billions of sources electronically, but they do not necessarily present the information in a way that facilitates the reader's comprehension and retention, nor do they offer the necessary electronic tools to deal with the mass of information generated. Thus, electronic resources can often overwhelm the reader with quantity, without providing the reader with the tools the mind needs to assimilate and use the information.

Thus, it would desirable to make it possible for people to more effectively deploy the information they have, find the information they need, and produce their desired work product. There is a need for improving the accessibility and management of information in electronic format.

SUMMARY OF THE INVENTION

A device, method, and system for providing an electronic reading environment is described herein. The device, method, and system convert standard electronic text or electronic documents into a hyper-text document. The hyper-text document transforms the text into access points that allow a reader to further explore each word, group of words, or image in the converted hyper-text document. Navigational aids and features assist in combining the advantages of paper-based and electronic-based text into an electronic reading environment.

According to an aspect of the present embodiment, a first electronic document includes one or more access points. Each of the access points can lead to a second electronic document. A generated route map then graphically relates the first electronic document with the second electronic document. In the exemplary embodiment, the first electronic document is the main reading document and contains one or more access points. Upon activating an access point, it leads to a second electronic document that is an additional source of information relating to the activated access point.

In yet another aspect of the present embodiment, a method of assisting in the assimilation of electronic information includes converting an electronic document into a hyper-document. Each word, group of words, or image in the hyper-document can be an access point available for selection. Upon selection, an electronic search may be initiated and the search results are displayed. In the exemplary embodiment, other sources of information may be selected from the search results, and may also be transformed into a hyper-document. According to this exemplary embodiment, the search may proceed from the original electronic document to any number of subsequent electronic documents.

According to another aspect of the present embodiment, a method of simulating paper-based text in an electronic environment is provided. The method includes displaying an electronic document, marking the electronic document, and navigating the marked electronic document. In the exemplary embodiment, the marked electronic document includes tabbing, underlining, highlighting and circling text, making notes, or drawing images. The marked text may be electronically searched or saved, or both. According to this exemplary embodiment, the marking may be saved.

In another aspect of the present embodiment, electronic text is converted into a hyper-document for display, and can be marked. In the exemplary embodiment, marking includes writing on the screen to underline, highlight and circle text, make notes, or to draw images.

The present embodiments may utilize any type of electronic text to provide an electronic reading environment. The electronic reading environment is preferably designed to help people reading text in electronic form, by deploying electronic aids such as to make reading more efficient, to improve reader comprehension, and to enable the exploration of related information and additional sources. The electronic reading environment creates an environment within which any electronic text may be read, and preferably provides that environment with powerful search engines, databases, and navigational aids. Such an environment can reduce cognitive load and disorientation.

Navigational aids can be activated to assist the reader's exploration and reduce his or her cognitive load. Hardship often associated with reading electronic text, searching electronic databases, and browsing networks such as the Internet is reduced, by providing the reader with information they need or find appealing, at the right time. Every electronic text is preferably transformed into a window through which a reader can "reach" for connections and relationships to other information that might otherwise go undiscovered.

Reading electronic-based text in this environment, instead of paper-based text, allows the reader to leverage the benefits of computer technology to increase the reader's ability to access related information, understand the information retrieved, and to create new knowledge with that understanding. In other words, by facilitating the use of electronic text, and the concurrent exploration of related information and resources, the present embodiments might actually enable knowledge creation, instead of merely increasing the efficiency of moving existing knowledge.

The foregoing and other objects, features and advantages of the electronic reading environment will be apparent from the following more particular description of preferred embodiments as illustrated in the accompanying drawings.

DETAILED DESCRIPTION OF PREFERRED EMBODIMENTS

The exemplary embodiments described herein disclose a device, system, and method for providing an electronic reading environment. The exemplary embodiments may enable people to more effectively deploy the information they have, find the information they need, create new knowledge, and produce a desirable work product. The exemplary embodiments can be utilized for accessing and managing information. To illustrate the exemplary embodiments, a computer with sufficient processing power and high-resolution screen is utilized. However, the electronic reading environment can be adapted for use on other types of electronic devices and computers, known in the art, using the teachings described herein. Therefore, details regarding the computer are provided as an example, and are not necessary to the invention unless otherwise specified.

Figure 1:
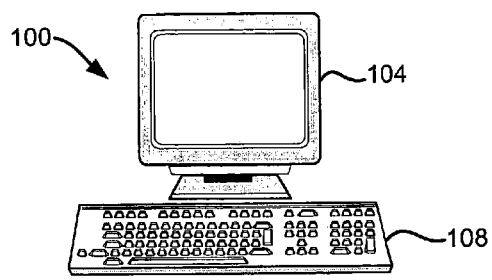
FIG. 1 illustrates an exemplary personal computer that runs the electronic reading environment (ERE) application software.

FIG. 1 illustrates an exemplary personal computer 100 that preferably runs the electronic reading environment (ERE) application software. The personal computer 100 may generally include a display 104 and keyboard 108, even though data can be accessed and entered without the keyboard 108. Preferably, the display 104 is large enough to allow at least one full 8.5×11 inch page of text to be displayed. Not shown is the personal computer 100 memory and processor that preferably stores an electronic document and processes the ERE application software, respectively. It should be understood that the electronic document or the ERE application software or both may be accessed remotely, such as over a network. Thus, the personal computer 100 does not necessarily require storing the electronic document or processing the ERE application software or both.

Of course, if so desired, other types of hardware interfaces can run the ERE application such as a notebook PC with one or two monitors (e.g., two monitors simulate a paper-based book), a pen-based computer, an electronic book, a personal digital assistant (PDA), a reading and/or writing electronic tablet, an internet appliance, or any other hardware interface on which a user could read or listen to electronically stored and represented text.

Figure 2:
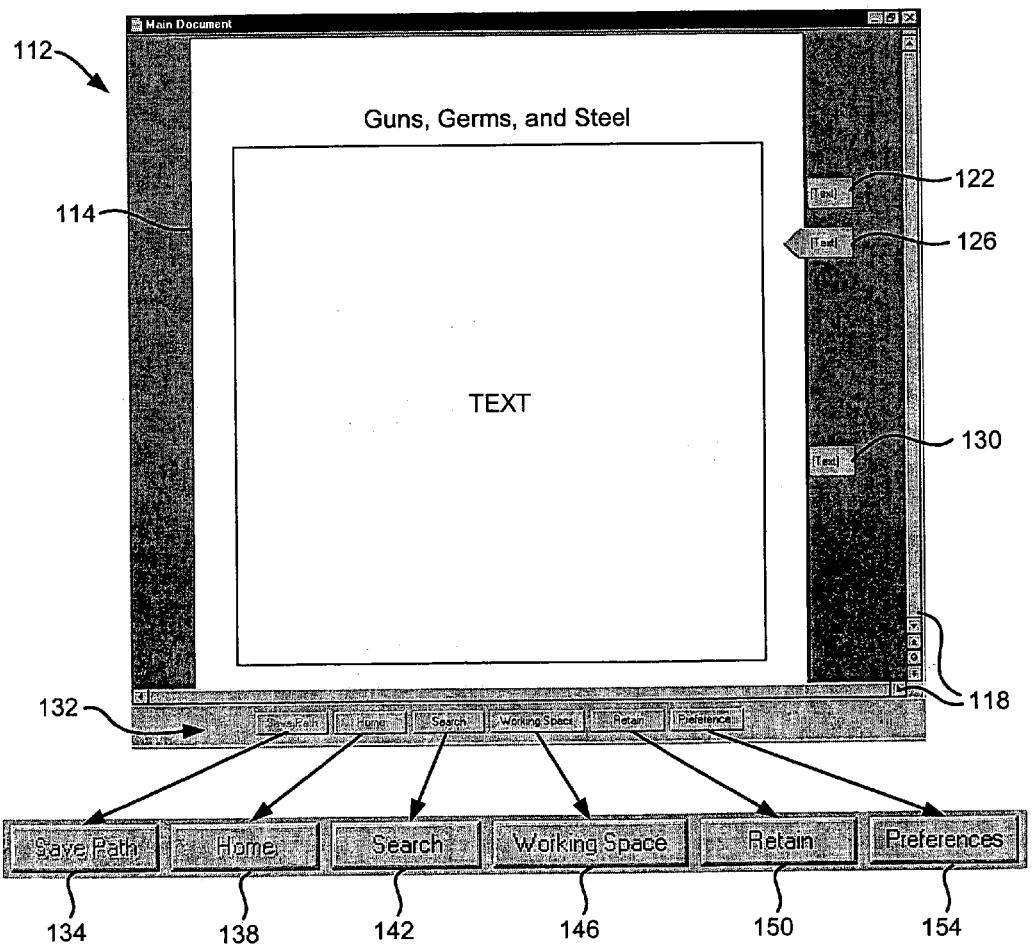
FIG. 2 illustrates a main document screen shot of the ERE application software of FIG. 1.

The electronic document can include any readable or audible text in electronic format. The electronic document could be, for example, a single paragraph about a product, a web page, a newspaper article, a textbook, a journal, a magazine, or a novel. According to this exemplary embodiment, assume for purposes of illustration only that the electronic document, referred to herein as the "main document" shall be an electronically formatted version of the book titled "Guns, Germs, and Steel: The Fates of Human Societies" by Jared Diamond (W.W. Norton & Company, 1999, paperback) hereinafter referred to as "Guns, Germs and Steel . . . ". The main document is used in the following example, and is illustrated in FIG. 2, to describe general operation of the ERE application software, and the tools ERE makes available to the reader to facilitate the reading, comprehension and navigation of electronic text. Also included are general operation and features of ERE, and a description of additional features that may be more particularly suited to educational applications of ERE.

FIG. 2 illustrates an exemplary screen shot 112 of the main document 114 (e.g., Guns, Germs, and Steel . . . ). Included in the screen shot 112 are scroll bars 118 for navigating the main document 114 and a menu bar 132 with "buttons" that can be clicked on (or pressed if the display 104 is touch-screen based). Included in the menu bar 132 are six separate buttons, namely "Save Path" 134, "Home" 138, "Search" 142, "Working Space" 146, "Retain" 150, and "Preference" 154. More or fewer buttons may be utilized. Also, it should be noted that the exemplary screen shot 112 is Microsoft Windows based, but other types of operating environments or hardware platforms may be utilized.

Once the main document 114 is open within ERE, the reader can read the text without necessarily activating any of the navigational and comprehension aids that ERE might offer. According to this exemplary embodiment, at least one, preferably two, full pages in high-resolution text is displayed without scrolling. Preferably, there is little, if anything, else on the screen to avoid clutter that might distract the reader from the text of the main document 114. However, navigational and comprehension aids such as access points are made available to the reader. By converting the electronic document into a hyper-document, each word, multiple words, or image in the text are access points to more information from related documents and references.

Transforming text into access points preferably enables the reader to research and explore any word or phrase in the main document 114 and subsequent documents for more information and detail on any term, concept, topic, person, reference, or cited source presented in the main document 114 and subsequent documents. To activate an access point, one can simply use an input device such as a mouse, keyboard, voice, eye travel apparatus, or touch display to select any word or phrase in the main document 114 as an access point to various databases within communication access by the ERE application.

For example, assume that on page 257 of the main document 114, Diamond (the author of Guns, Germs, and Steel . . . ) writes about how the Japanese decided to abandon guns some time after their introduction into Japan in 1543 A.D. by two Portuguese adventurers. Diamond describes how the samurai-controlled government effectively banned guns. He does not, however, go into great detail about the samurai, their history, their code of conduct, their methods, or their swords. If the reader is interested in more information and detail about such matters, the word "samurai" or the phrase "samurai swordsmen" on page 257 of Diamond's book may be selected as an access point.

According to this example, to select "samurai" as the access point, the reader would click on the word using an input device that preferably highlights and selects the word in one step. The reader may then select the Search button 142. Consequently, a search would be initiated for "samurai" in an electronic dictionary, electronic encyclopedia, and if so desirable in other known databases and search engines. Preferably, the search can be tailored to accommodate the reader's particular needs, the tailorability described more below. Upon completion of the initial search for "samurai," an access point search result and database selection menu window may be generated.

Figure 3:
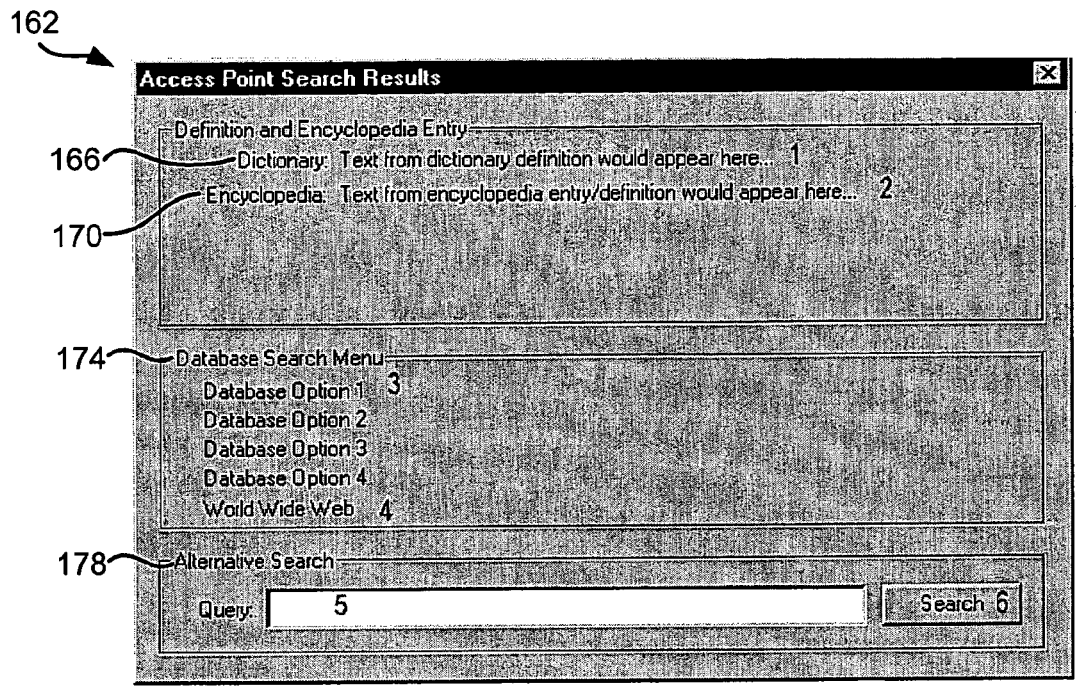
FIG. 3 illustrates an access point search result and database selection screen shot.

FIG. 3 illustrates an exemplary access point search result and database selection screen shot 162 that provides the reader with a selection of databases and search engines including a dictionary definition 166, an encyclopedia entry 170, and a database search menu 174 that can be tailored for the particular reader. Moreover, an alternate search 178 using a query that is different than the original access point selected can be provided. According to the above example, a word or phrase of words different from "samurai" can be entered into the alternate search 178. Likewise, "samurai" can also be entered into the alternate search 178, to search other databases or sources besides the dictionary or encyclopedia.

The database search menu 174 could list, by way of example ERIC, DIALOG, LEXIS, specific periodicals (e.g., newspapers, magazines, scholarly journals), specific university or other libraries (e.g., Harvard University, The Library of Congress, The National Library of Medicine), established reference sources related to the subject matter of "Guns, Germs, and Steel . . .", and the World Wide Web. Note that the access point search result and database selection screenshot 162, can become more useful as more references and other sources are available online in electronic format.

According to the above example, the access point search result and database selection window 162 can include the dictionary definition 166 of "samurai", the encyclopedia entry 170 for "samurai", additional sources related to "samurai" in the various databases available for further searching in the database search menu 174, and a space to enter an alternative search query 178 (e.g., so that the reader may choose to search something other than "samurai").

Instead of choosing a single word like "samurai" as an access point, the reader can preferably select an access point that includes more than one word, if so desired. For example, "samurai swordsmen" would initiate a search for either "samurai" or "swordsmen" or both terms together. According to this example, the access point search result and database selection menu 162 can contain the dictionary definition 166 and the encyclopedia entry 170 for "samurai", "swordsmen", and "samurai swordsmen", additional sources related to "samurai", "swordsmen", and "samurai swordsmen", in the various databases available for further searching in the database search menu 174, and a space to enter an alternative search 178 query (e.g., so that the reader may choose to search something other than "samurai swordsmen").

Finding related sources on the basis of an access point composed of more than one word might require that the reader enter an alternative search 178 query, or that the reader's access point selection be transformed into a functional search query, Boolean or otherwise. For greater success, the alternative search query 178 and search algorithm may draw related words from the phrase, sentence, paragraph or section in which the access point is situated. It should be understood that access points can include text, sounds, images, and animation, which may be better utilized if the personal computer 100 or other hardware interface has multimedia capabilities.

Preferably, the reader can search any word or phrase (i.e. access point) in a document discovered from searching a word or phrase (i.e. access point) in the main document 114. To better illustrate multiple searches and the electronic documents found by the multiple searches, assume that the first search provides an electronic document referred to as an "Orbit 1 document". For example, the Encyclopedia entry 170 can be referred to as an Orbit 1 document. Any document discovered from researching a word or phrase in an Orbit 1 document can be referred to as an Orbit 2 document, and so on (e.g. Orbit 3, Orbit 4, etc.)

From the above example, an access point can be selected from the information, documents, or other sources generated as a result of the search for "samurai" or "samurai swordsmen".

Thus, a reader can select an access point in an electronic document other than the main document 114. Assume, for example, that the access point search result and database selection screen shot 162 from the search of "samurai" in "Guns, Germs, and Steel . . ." included an Encyclopedia Britannica entry on samurai, which is an Orbit 1 document. In the encyclopedia entry, assume there are references to "Zen Buddhism" and the "Bushido" (or Code of the Samurai), among other things. "Zen Buddhism" or "Bushido" or both, or any other access point in the Orbit 1 document, can be selected by selecting on one or all of these terms. Accordingly, these terms are access points to Orbit 2 documents on the topics of Zen Buddhism or the Bushido.

So, if "Bushido" was selected from the Orbit 1 document (i.e. the Encyclopedia Britannica entry on "samurai"), a search for more information about this term is preferably initiated. Searching for "Bushido" could have revealed "Code of the Samurai," a modern translation of the Bushido by Thomas Cleary (Tuttle Publishing, 1999). Accordingly, the "Code of the Samurai" is an Orbit 2 document in this example.

Moreover, Orbit 3 documents, Orbit 4 documents, and so on can be explored no matter how far the reader explores away from the main document 114. Thus, based on the above example the reader could access Cleary's book, select an access point in his book, and continue the exploration to an Orbit 3 document. For example, assume on page XII of the Introduction of the "Code of the Samurai", Cleary writes, "The stability of the Kamakura regime was fatally rocked by Mongol invasions in 1274 and 1281." While the reader could search any word or phrase in this sentence, the reader might find "Kamakura" or "Mongol invasions" particularly intriguing. Thus, the reader could preferably select either or both of these phrases as access points for further exploration. For example, if the reader chose "Kamakura", a map of this mountainous region not far from Tokyo in eastern Japan would preferably be shown. Accordingly, this map would be an Orbit 3 document in the example. If the reader chose "Mongol invasions," sources concerning Mongol invasions across Asia and Europe, including specific information about their invasions of Japan could preferably be obtained. These sources would also be Orbit 3 documents.

To provide the reader with an organized view of the Orbit documents, a route map may be provided. Once the reader has selected an access point from an Orbit 1 document (e.g., selecting "Bushido" from the Encyclopedia Britannica entry on "samurai"), the route map 182 is preferably generated and visible on the screen. According to the exemplary embodiment, the route map may be viewed in a separate window near the main document 114.

Figure 4:
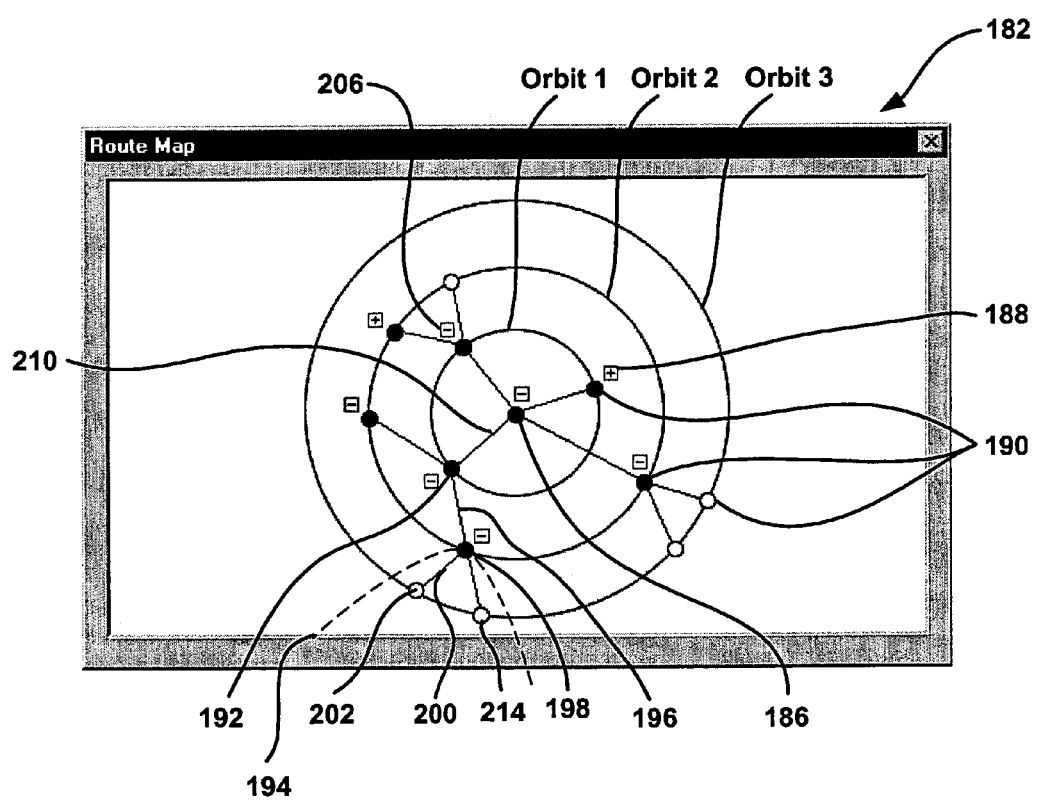
FIG. 4 illustrates an orbital route map screen shot.

FIG. 4 illustrates an exemplary orbital route map 182. The route map 182 is a graphical representation of the reader's path of exploration away from the main document 114, among other things, to aid navigation to and from documents related to the main document 114, or to one another, by enabling the reader to return home (i.e. back to the main document 114), or to any other document explored, immediately. In this exemplary route map 182, the node 186 represents the main document 114.

According to this exemplary embodiment, the orbital route map 182 provides a dimensional graphical record or representation of where the reader has been and viewed spherically. It should be understood that the orbital route map 182 may also be presented in 3-dimension (3-D). The route map 182 preferably displays spatially the relationships between the main document 114 at node 186 and the other documents, represented by nodes 190, 192, 198, 202, and 214, or sources the reader explored. At the center of the route map 182, the node and/or title of the main document 114 (e.g. "Guns, Germs, and Steel . . . ") at node 186 is preferably visible, with lines drawn out towards the other sources and documents represented by nodes 190, 192, 198, 202, and 214 to indicate where the reader has visited. These documents or sources represented by nodes 190, 192, 198, 202, and 214 would be located graphically in the appropriate "orbit" around the main document 114 at node 186. The reader may jump between electronic documents and/or orbits by selecting their corresponding node or document title. Moreover, the reader can preferably expand or minimize the documents shown in the route map 182 by selecting the appropriate expand box 188 or minimize box 206. The generated route map 182 may be saved, if desired.

According to the above example, there might be a line 210 from "Guns, Germs, and Steel . . . " main document 114 at node 186 at the center to the Encyclopedia Britannica entry node 192 on "samurai" in Orbit 1, a line 196 from the encyclopedia entry node 192 to the "Bushido" node 198 in Orbit 2, and a line 200 from the "Bushido" node 198 to a map of "Kamakura" node 202 in Orbit 3. The lines 210, 196, and 200 preferably represent a path taken by the reader.

Also, once the reader has selected an access point from a document other than the main document, a return home (i.e. Home) button is generated and visible on the screen until the current session ends. This button returns the reader to the main document 114 (i.e. "Guns, Germs, and Steel . . . ") from wherever the reader is in the route map or search path (the "Path" is the reader's navigational path, i.e. where the reader has been as they browsed and explored additional sources away from the main document). If the reader selects to return home, they are preferably given the option to save path before returning to the main document 114.

Figure 5:
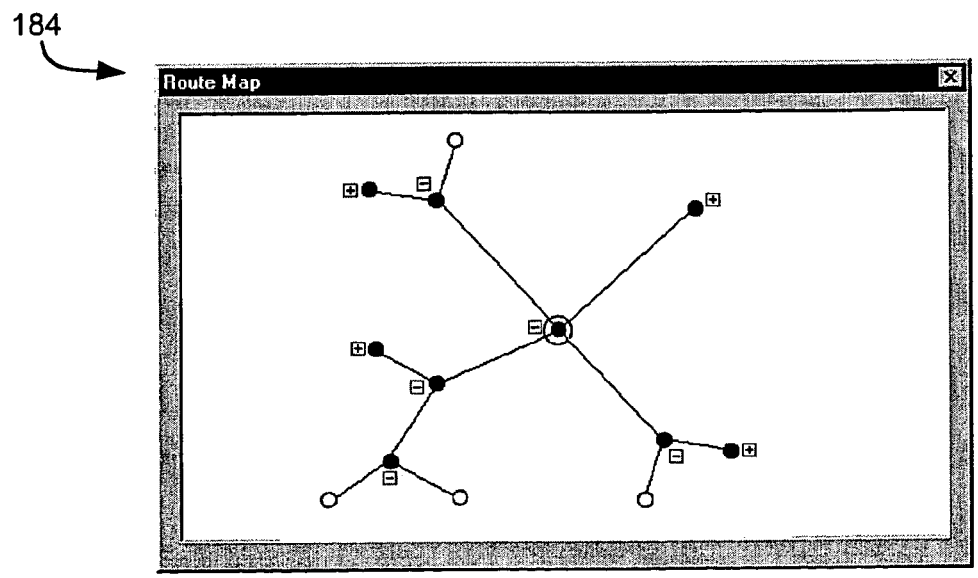
FIG. 5 illustrates a 2-dimensional (2-D) route map screen shot.

FIG. 5 illustrates another exemplary 2-dimensional (2-D) route map 184. The 2-D route map 184 may be selected instead of the orbital route map 182, if so desired. The route map 184 preferably includes nodes that represent the main document 114 at node 186 and any subsequent documents, similarly to the orbital route map 182 of FIG. 4. Lines are drawn to interconnect the nodes providing a graphical relationship of the path taken by the reader or other readers, as described below. Preferably, the 2-D route map 184 allows the reader to jump between electronic documents, expand or minimize the documents shown, and save the route map 184 similarly to the orbital route map 182.

As described above, the route map 182, 184 graphically displays the route or path of discovery that a user takes while reading the main document 114, researching and exploring related information, and reading documents other than the main document 114. In addition to depicting the entire collection of discovered documents, the route map 182, 184 may also depict the actual path the user takes in proceeding from document to document and presents it in a form which allows the user to view their path of discovery, to consider the relationship between the various discovered documents and other sources, to navigate quickly to a previous or subsequent document or node in their path, and to keep track of how far their path has diverged from the main document 114. The route map 182, 184 preferably reduces confusion, and makes exploration and research away from the main document 114 more efficient and productive.

The route map 182, 184 can be similar to a rectangular canvas on which graphical representations of the documents that the user has discovered are displayed, along with linkages between documents and relevant controls. Preferably, the user can select to have the route map 182, 184 represented as a web of documents (e.g., 184) around the main document 114, or a set of orbital documents (e.g., 182) around the main document 114. The graphical representation of a document, or node, is preferably represented by a user-chosen icon and a user-settable relevance setting—a number between 1 and 10 that the user sets to allow a subsequent scan to pick out the pages which the user found most useful. Each node is preferably colored based on its distance from the main document 114 used to begin the discovery process, with all documents exactly n discoveries from the main document 114 colored the same, with unique colors for each value of n. In addition, directional links between the document and other documents that the user either discovered from the main document or discovered from subsequent documents may be displayed as unidirectional arrows pointing from the source document to the discovered document.

As described above, the center node 186 of the route map is the graphical representation of the main document 114. The route map 182, 184 view consists of the set of orbits, or web, that grows about this center node 186 as the user explores and discovers documents and other sources from access points in the main document 114, and from access points in documents discovered from the main document 114, and so on.

For every document, the route map preferably defines its sub-web as the set of documents and links that are discovered beginning at, or from, that document (i.e. as if that document were the main document 114). Each node preferably has a small control attached to it which controls the display of the sub-web of the documents represented by that node. The control is a small box with either a plus or minus symbol in it—a plus if the sub-web is currently collapsed, which would set it to expand, and a minus if the sub-web is expanded to cause it to collapse.

Referring back to FIG. 4, the layout of the nodes in the route map 182 preferably uses a center of mass weighting scheme. The algorithm begins by laying out all the nodes 190, 192, 198, 202, and 214 beginning at the center node 186 (respecting collapsed sub-webs) in an evenly-spaced fashion as follows. The displayable arc around each node is the portion of the arc around the node which is not already filled by another node's sub-web. The layout is done as in a breadth-first search from the center node, hence all nodes of discovery distance n are considered before those of discovery distance n+1. For each node, the nodes discovered from the node are called the children of that node. As each node is considered, its children are added to the layout, evenly spaced in the displayable arc of the node. For example, node 198 has two children 202 and 214, and each is placed in one-third of the displayable arc 194 of the node 198. Once this initial layout is completed, the boundaries are computed and the entire layout is scaled to fit the route map 182. In this way, the center of mass of the layout ends up placed at the center of the route map 182, which is the most efficient use of the space, allowing far more nodes to be viewed than a scheme which places the center node in the center of the route map 182.

When a cross-link occurs, the tree structure defined above breaks down, making display impossible. To handle this case, each separate instance of the cross-link is displayed separately, with the entire structure mirrored in each case. In the event that a cross-linked node is the center node, the discussion becomes moot, as the cross-links no longer present a display problem.

An additional space saving feature that could be implemented is to scale the link lengths based on the discovery distance from the center node, so sub-webs with great depth would take comparatively less space as the deeper nodes would demand less and less display space. However, this does lead to pathological examples which can cause problems, e.g., a chain of single links with hundreds of nodes would end up in a large mass at the end where the link lengths would get extremely small. A possible compromise solution is to make the link length the sum of a constant minimum length and a function of the discovery distance. Preferably marginalia is enabled on any electronic page of "Guns, Germs, and Steel . . . " or on any other source (e.g., encyclopedia entry, "Code of the Samurai") in the Path. For example, assume the following passage on pages 132 and 133 of "Guns, Germs, and Steel . . . " is particularly noteworthy to the reader "Our failure to domesticate even a single major new food plant in modern times suggests that ancient peoples really may have explored virtually all useful wild plants and domesticated all the ones worth domesticating." The reader may then tab the passage, underline it, circle it, highlight the text with different colors, or draw images related to it. Preferably the textual marginalia can be electronically searched. Preferably, additional working space may also be provided to the reader.

Figure 6:
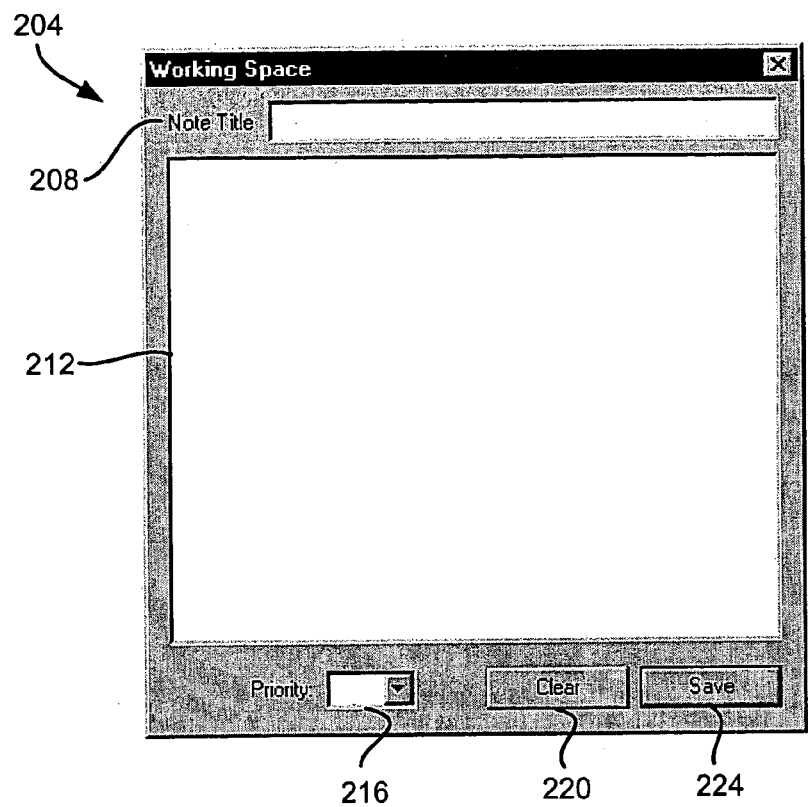
FIG. 6 illustrates a working space window screen shot.

FIG. 6 illustrates an exemplary working space 204 that can be provided upon selection of the working space button 146 of FIG. 2. The reader can write and draw on the electronic text and the electronic document display (114 in FIG. 1) as one could on paper-based text, and request the additional working space 204. Preferably, the working space 204 is available to the reader at any point in "Guns, Germs, and Steel . . . " or the reader's Path (i.e., encyclopedia, "Code of the Samurai", sources on Mongol invasions) to enter comments and text by means other than marginalia. Using the passage in the above example, working space 204 can be requested to enter a comment about the highlighted passage. The working space 204, in effect, preferably makes the margins as large as one needs them to be.

Preferably, the working space 204 would be a separate window in which the reader could enter text or draw images in window 212 and have more room to write or draw than provided in the margins of the document display 114, if so desired. The reader can add a title or note at 208, and set priority to the working space at 216. This title or note 208 could be displayed in the flag or tab (e.g. 122) denoting the location where the working space 204 was inserted. Moreover, the reader can clear or save the working space at 220 and 224, respectively. A working space flag or tab would be displayed on the document screen adjacent to the text where the reader used this option.

Referring back to FIG. 2, a save path button 134 can be available on the screen until the current session is ended. When save path 134 is selected, additional sources, sites, or documents visited from the main document 114, and any marginalia and working space created, are saved together with the main document 114. Therefore, the navigational path and/or work product is stored, so that the reader may renew and review their search later.

Figure 7:
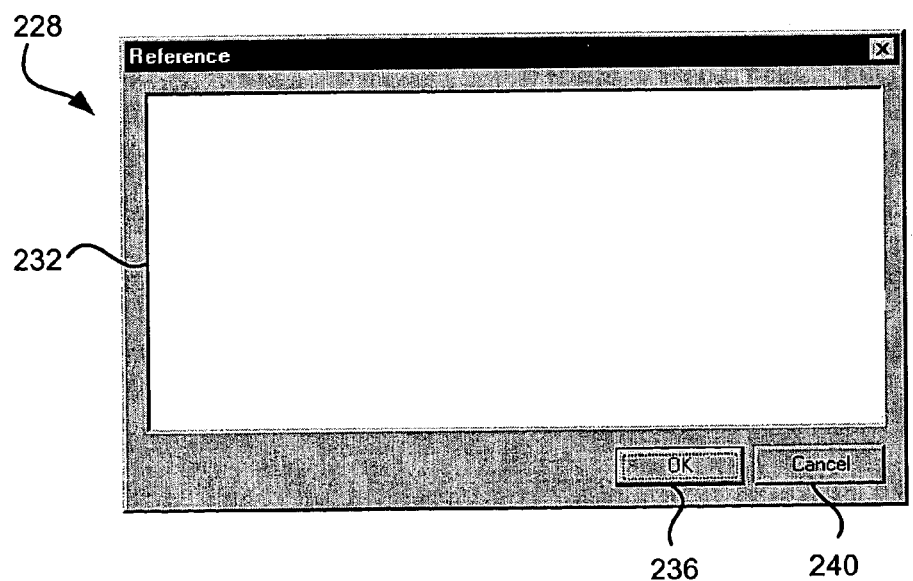
FIG. 7 illustrates a reference window screen shot.

FIG. 7 illustrates an exemplary reference window 228. Text or an image from any page in any electronic document, including the main document 114, may be selected, if so desired, to remain visible in a separate window, even as the reader change pages and change documents. So, for example, a reader can select text or images to be visible in the reference window 228, by using the Retain button 150 of FIG. 2, so that text or image remains visible as the reader change pages in "Guns, Germs, and Steel . . . " or any other document in the reader's Path.

For another example, an author may introduce a section of text with an introductory sentence. The introductory sentence(s) (or any other helpful text selected) once selected, and upon selecting the Retain button 150, would remain visible so that the reader can remain oriented and focused on the purpose of the current section of text. Thus, the reference text window 228 preferably enables the reader to refer to text or an image in the reference text window 228 even as the reader proceeds through subsequent pages of the main document or other document. The reference window 228 also makes it possible to outline the content of the main document 114 or any other document in the reader's navigational path.

In yet another example, authors often divide sections of text into subsections using headings and subheadings. The headings and subheadings can be moved into a reference text window 228, so that the reader could refer quickly to the heading of the current section of text, and see how this section of text relates to prior sections and subsections. In this way, the reader of electronic text may be better able to orient in the text as a whole, and be better able to understand the author's intentions and goals in the current section or subsection.

In another exemplary embodiment, an image can be selected and visible in the reference window 228 to remain visible as the reader changes the electronic pages in "Guns, Germs, and Steel . . . " or any other document in the reader's path.

According to this exemplary embodiment, if the text refers to or includes an image, the reader may select to have that image displayed separately from its original location in the text, so that as the reader proceeds through pages of text, the image remains visible. For example, if the author of an electronic document is referring to a map, in a conventional book at some point one must turn the page and lose sight of the map, even though text on subsequent pages continues to refer to the map. Because it may be inconvenient and distracting to move back and forth between current and prior paper or electronic pages, the map is preferably visible in the reference window 228 for as long as the reader chooses, so that the image and the related text can be easily viewed.

For example, assume on page 56 of "Guns, Germs, and Steel . . . ", Diamond provides a map of the Polynesian islands. This map is visible on paper-based pages 56 and 57, so when one reads of the Chathams (Chatham Islands), on pages 56 and 57, the map can be quickly referenced and the reader can determine the islands' location relative to other islands referred to in the text, including New Zealand. On pages 58 and following, the paper-based text continues to refer to the islands, but the map is no longer visible, and it quickly becomes tiresome in paper-based text to flip back and forth every time the reader has a question about an island's location. The reference window 228 preferably keeps the map visible adjacent to the text the reader is reading, which may ease reading and comprehension.

Referring back to FIG. 2, the reader may use virtual flags or tabs 122, 126, 130 to mark significant text and facilitate navigation in the main document 114 and other electronic documents in the reader's path. Virtual flags or tabs 122, 126, 130 can mark important text or images in a way that makes the location of such text or images visible even when the reader is not reading the page on which the text is located. The flags or tabs 122, 126, 130 may preferably be written on, and such notes are preferably visible in subsequent or prior pages of electronic text, and the reader would be able to jump to the flagged page by clicking on the tab.

Search button 142 allows the main document and other sources in the Path to be searched for any word or phrase. For example, if the reader is on page 309 of "Guns, Germs, and Steel, . . . " and remembers a passage somewhere in the prior 308 pages about "Pizarro,", they can search for that name. This may be particularly useful to the reader of documents (e.g., a lengthy journal article, or legal brief) that do not supply an index.

Moreover, the reader may highlight the text they are reading, by tracking their eye movement, to make reading electronic text more efficient and less difficult. Eye movement can be tracked to highlight the text the reader is reading.

The exemplary embodiments described herein may also be utilized as an effective tool in educational settings or business settings. For example, an instructor in educational settings can utilize the embodiments to tailor how students use ERE to read assigned texts for class and to explore related information, and to facilitate collaborative learning between students, among students and their instructors, and among students, their instructors, and outside experts. For FIGS. 8-16, assume that the main document is a textbook, novel, newspaper article or other electronic reading material assigned by the instructor, and required of the students. It should be understood however that FIGS. 8-16 are only exemplary and that the features, and their educational uses, described herein may be utilized in other settings such as in business or at home.

Figure 8:
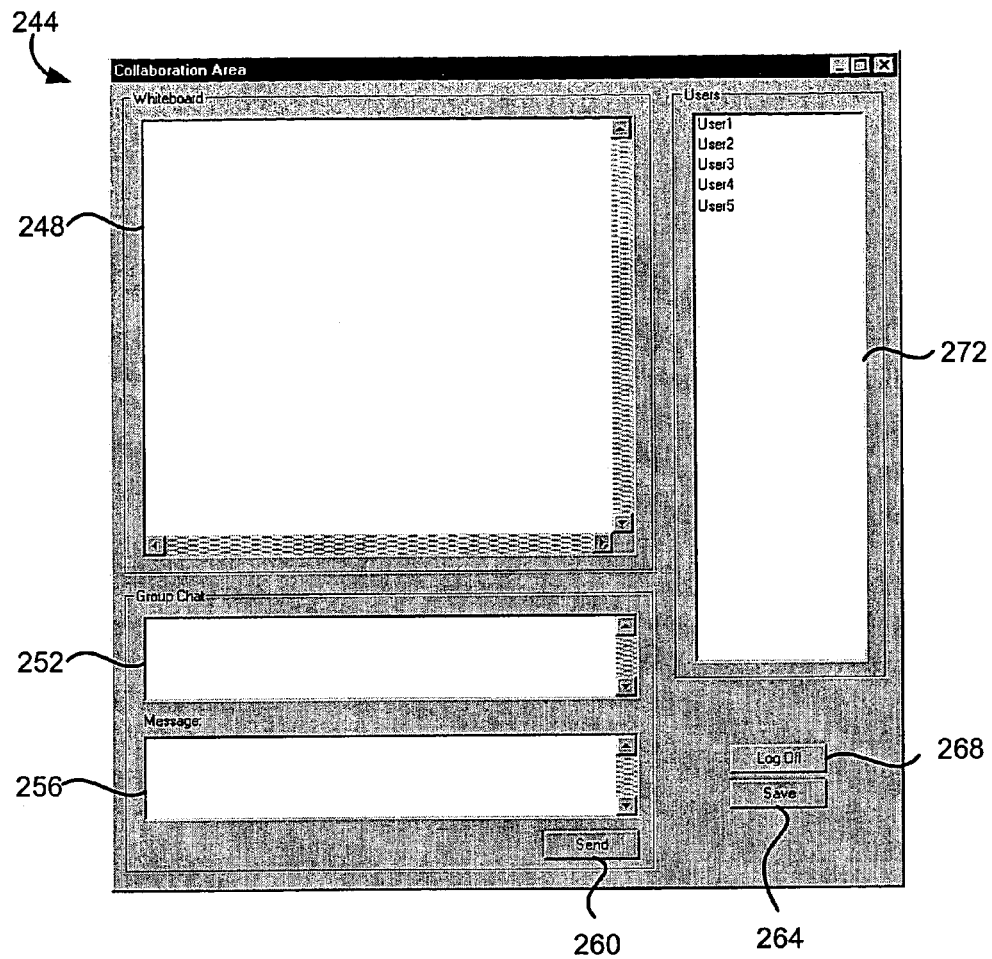
FIG. 8 illustrates a collaboration area screen shot.

FIG. 8 illustrates an exemplary collaboration area 244. The collaboration area 244 may include a whiteboard 248, group chat window 252, message center 256, and a list of users logged on 272. The collaboration area 244 preferably allows concurrent searching by members of a group (e.g., those logged on and listed at 272), where each group member can see the products of the other searches, and begin a path from where a fellow group member has been, and allows group members to share links, images, and notes. Moreover, the instructor may review paths and respond to questions in real-time.

The whiteboard 248 allows a reader to enter notes to themselves, work out problems, draw images etc. Preferably, the whiteboard 248 replicates "scratch paper" that may be used to provide the reader with additional working space. The group chat window 252 allows a reader to chat with others over a network connection. The message center 256 allows a reader to enter messages that are distributed to the group by pressing or clicking on the send button 260. Readers can log off of the collaboration area 244 by pressing or clicking on the log off button 268. Accordingly, the messages and work can be saved by pressing or clicking on the save button 264.

Figure 9:
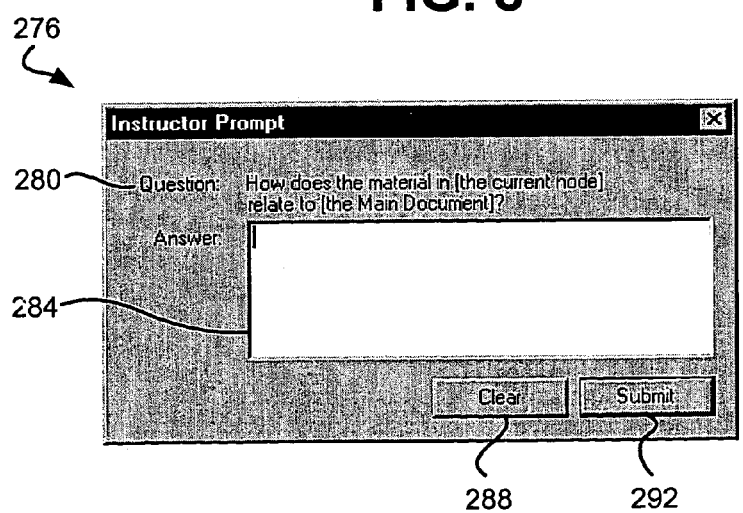
FIG. 9 illustrates an instructor prompt window screen shot.

FIG. 9 illustrates an exemplary instructor prompt window 276. The instructor prompt window 276 can supply instructors, professors, supervisors, etc., with the ability to ask a question 280 related to a particular topic, for example to ensure that students are on-task and understand what they are reading as they explore away from the main document. The reader may then enter an answer at 284.

Figure 10:
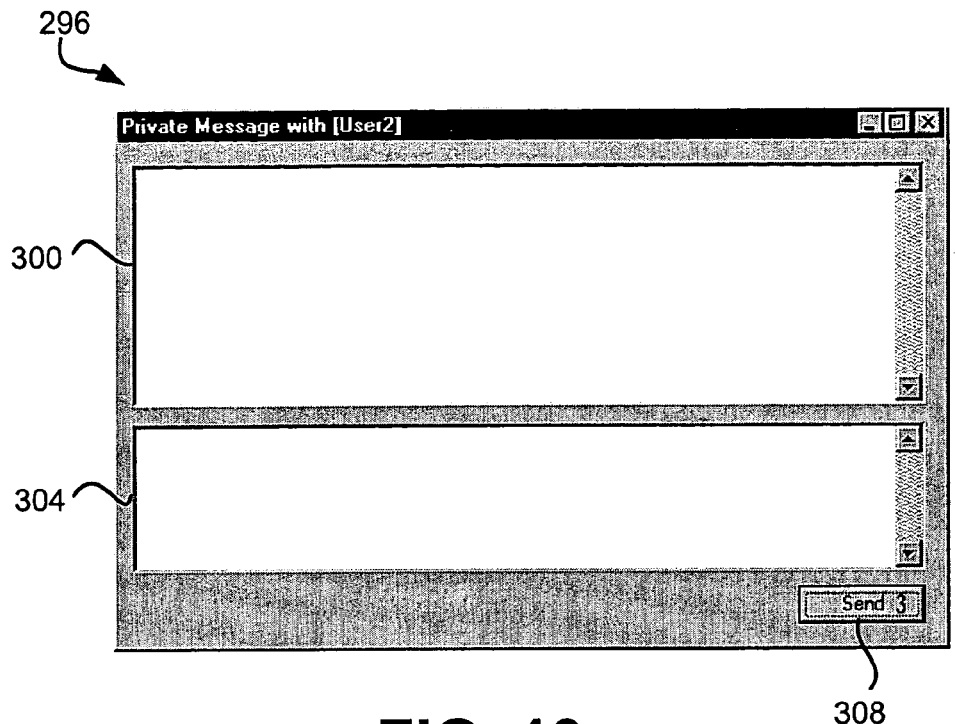
FIG. 10 illustrates a private message screen shot.

FIG. 10 illustrates an exemplary private message board 296. The private message board 296 allows a reader to send to another collaborating user a private message meant for them and not necessarily for those remaining in the group.

Figure 11:
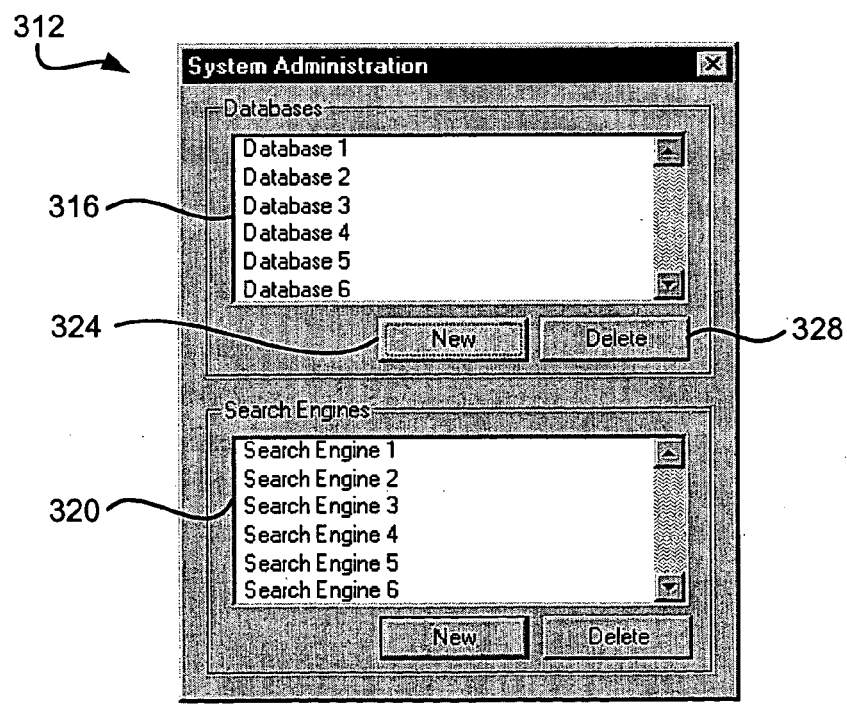
FIG. 11 illustrates a system administration screen shot.

FIG. 11 illustrates an exemplary system administration window 312. The system administration allows an administrator such as the instructor, supervisor, or the reader themselves to selectively choose the database in which an access point search will be performed. Recall that by pressing on an access point in the main document or any subsequent documents, a search is initiated. The search utilizes a number of databases 316 and search engines 320 that are preferably programmed via the system administration 312. By selecting on the desired databases and search engines, the search can be performed by utilizing only the selected databases and search engines.

Figure 12:
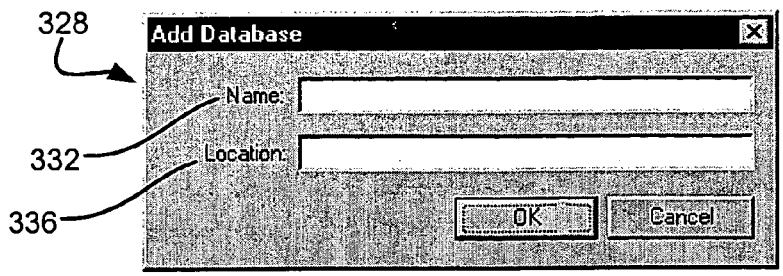
FIG. 12 illustrates an add database window screen shot.

FIG. 12 illustrates an exemplary add database window 328. This window allows a user to add another database to the system administration window in FIG. 11. The name and location of the database may be entered at 332 and 336 respectively.

Figure 13:
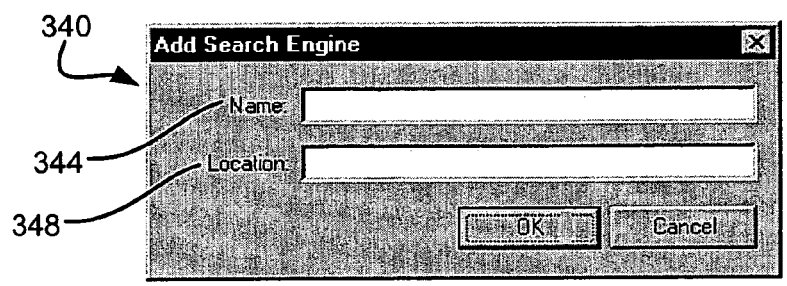
FIG. 13 illustrates an add search engine window screen shot.

FIG. 13 illustrates an exemplary add search engine window 340. This window allows a user to add another search engine to the system administration window in FIG. 11. The name location search engine may be entered at 344 and 348 respectively.

Figure 14:
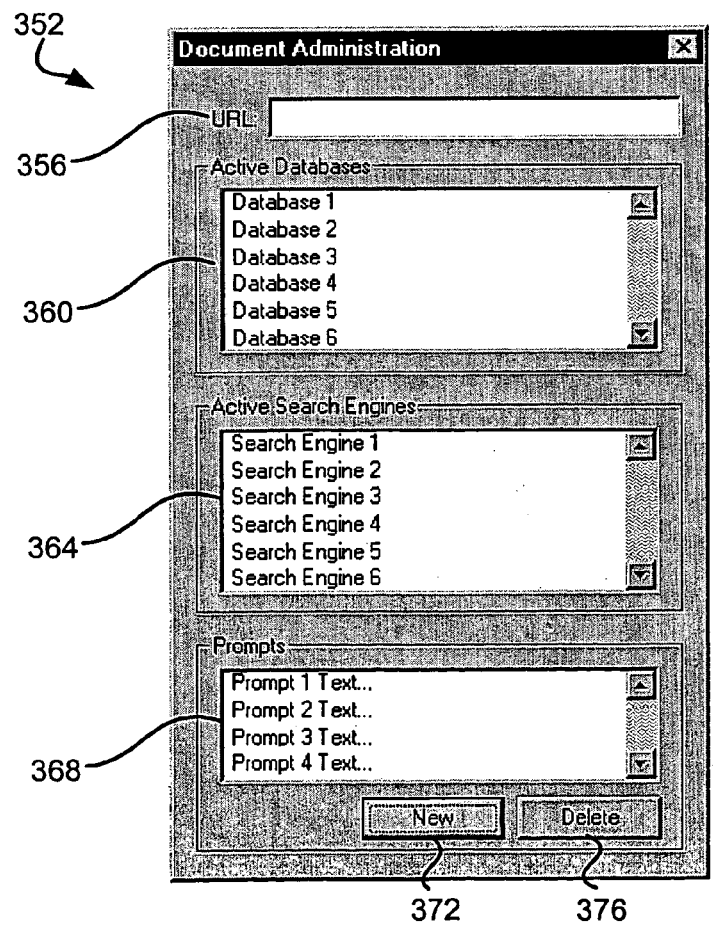
FIG. 14 illustrates a document administration window screen shot.

FIG. 14 illustrates an exemplary document administration window 352. This window allows the instructor or supervisor to setup the reading environment. URL 356 refers to a location of the document for which the databases, search engines and prompts are active, e.g., the main document if the main document is on the web rather than on the hard drive. Active databases window 360 shows enabled databases that are currently used in the reading environment. Active search engines window 364 shows enabled search engines that are currently used in the reading environment. Prompts 368 allow one to uniquely tailor the prompts that occur in the reading environment.

Figure 15:
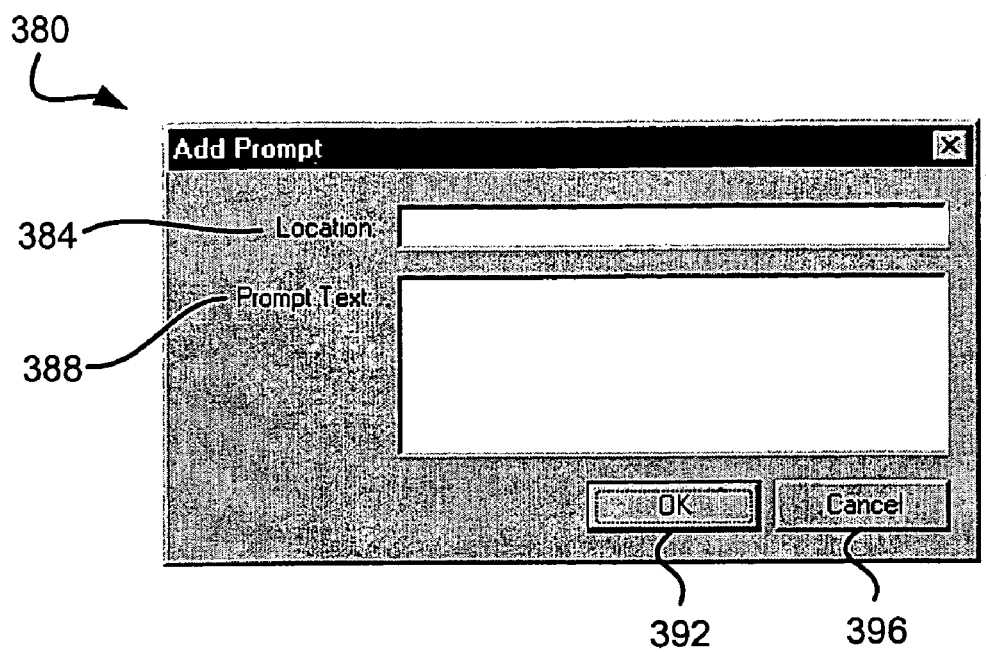
FIG. 15 illustrates an add prompt window screen shot.

FIG. 15 illustrates an exemplary add prompt window 380. The add prompt window 380 allows the instructor to enter the location for the prompt to occur 384 and the text of the prompt 388, to ensure that students, for example, are on-task and understand what they are reading as they explore away from the main document.

Figure 16:
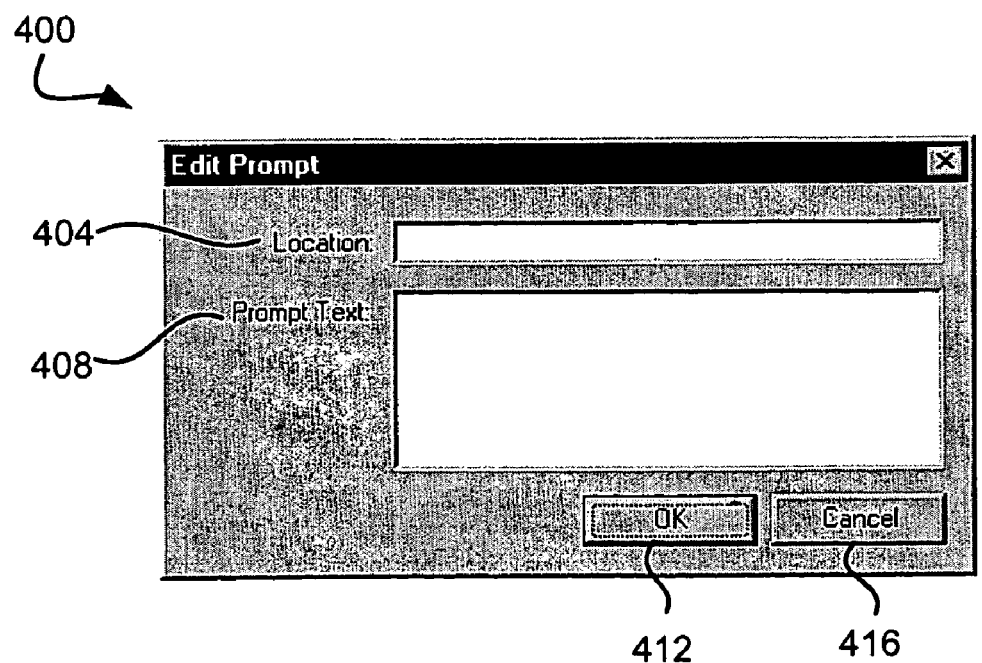
FIG. 16 illustrates an edit prompt window screen shot.

FIG. 16 illustrates an exemplary edit prompt window 400. The edit prompt window 400 allows the instructor to edit current prompts found in FIG. 15.

When used in educational settings, various features such as those shown in FIGS. 8-16 enable the instructor to tailor the reading environment to the students, to the subject matter of the class, and to the instructor's unique teaching style or philosophy. Tailoring to the students entails providing them with developmentally-appropriate tools. This may, however, involve limiting the number of features of ERE available to younger students, and providing for more structured exploration of Orbital documents (i.e. documents other than the main document).

For example, an instructor could limit the features that are available by changing preferences for ERE as it is used in the class. Furthermore, the instructor could decide that when second graders search access points in the main document, for example, a dictionary and an encyclopedia are all they will need, and ERE could be set to access additional information only from a dictionary and an encyclopedia. Thus, ERE would allow the instructor to decide which features are available, and how extensive student exploration of related information will be. After all, if student searching of orbital documents distracts them entirely from the main document, the instructor's goals are defeated, not augmented.

Tailoring ERE to the subject matter of the class may involve directing ERE's searching functions to additional information and sources (i.e. orbital documents) that relate specifically to the assigned reading material (i.e. the main document), or to the class more generally. For example, an instructor can focus the students' navigation beyond the main document by pre-selecting those databases that are most likely to contain information related to the subject matter of the main document, either by limiting the students to only those databases or by making them available in addition to other broader databases and resources.

Selection of databases could be done by domain (e.g., physical sciences, mathematics, literature, history, or social sciences, among others), by type of source (e.g., newspapers, general databases like ERIC, university libraries, domain-specific scholarly journals, and so on), or by named sources (e.g., NY Times). The databases selected by the instructor are preferably those that show up on the access point search result and database selection screen shot (e.g., FIG. 3), or are automatically searched when the student selects an access point, or both.

For example, an eighth grade instructor could decide, based on his experience teaching eighth graders, that searching beyond Orbit 2 documents is going to distract the class from the assigned main document. On the other hand, a university professor might encourage students to use ERE to search for any interesting relationships and connections between the main document and related sources, no matter how far removed from the main document.

ERE gives the instructor discretion in how to use this environment in connection with the subject matter of the course. Sometimes instructors might want to structure student exploration, and sometimes unfettered discovery will be the objective.

ERE may help instructors assess how well students understand the assigned reading material, as well as the related information they discovered through ERE-enabled exploration. Accordingly, an instructor could specify that the following features become active when a student is reading an assigned course document (i.e. the main document): an instructor could select to have ERE prompt student readers with questions about the assigned reading to aid comprehension and retention of information, by ensuring that students are thinking about how orbital documents relate to and illuminate the main document. These prompts can be generated automatically when the student explores beyond the main document and begins to read orbital documents, for example, just as a student clicks the Home button (138 in FIG. 2) to leave an Orbit 2 document. Queries and working space may then be displayed in which to respond to the prompt, for example: How does the document you are reading relate to the assigned book? What information in this document is relevant to the assigned book, and why? What further information would you need to understand how these two sources are related?

In contrast to these generic questions, which apply to any main document and any orbital document, ERE may also solicit or provide more adaptive feedback based on the student's demonstrated interests (i.e. selected access points and related Orbital documents), experience/knowledge level, or some other source of information about the student. In other words, ERE need not generate only preset queries, but instead may generate individual- or document-specific questions, and suggestions for related sources, as an intelligent tutoring system would.

In either case (i.e. generic or specific query), the instructor can review students responses, as they will be stored in the students' working space when they save their Path via the Save Path button (134 in FIG. 1). Instructors could review student paths, and the marginalia and comments in working space created by students, to assess how students were using ERE to elaborate upon assigned course materials. This review could reveal what each student finds interesting, which could help the instructor prepare future lessons. Also, the instructor could use a student's prior searches as examples of how research and exploration of new information can help the student understand assigned reading material.

Because students and instructors are likely going to be using ERE on networked equipment, ERE could be used collaboratively between students. ERE could allow concurrent reading and searching of the main document by members of a group, not just one student. The group members could be spread across a classroom, a school, between schools, or between homes. Each group member could see the products of the other members' searches, and begin a path from where a fellow group member has been. Group members could share sources, information, and images, and, if they are not in the same room, discuss their efforts by instant messaging. When students, or students and instructors, or learners and experts are working collaboratively, ERE could provide a virtual work area that is common to all group members (e.g., whiteboard 248 in FIG. 8), so that each group member could add handwritten or other text or images to the whiteboard, and that text or those images would then be visible on each group member's screen. The other members could then modify this text or the images so that, in effect, the whiteboard provides a shared working space that changes in real-time as each group member modifies or adds to prior contributions from his or her peers.

Moreover, knowledge can be employed by an expert in a given domain to aid the user as he or she reads the main document and searches related documents. For example, if a reader selects an access point (e.g., "John Dewey" in a textbook), ERE could supply information, related sources, links, and databases most closely related to John Dewey, as supplied by an expert on Dewey's writing and educational philosophy, rather than initiating a broader Internet or large database search for the user.

The electronic reading environment described herein is preferably embodied as application software that serves as the environment in which readers could read any text in an electronic format. It should be understood however, that the electronic reading environment can be implemented in hardware or a combination of software and hardware, depending on the application.

However, before explaining further the electronic reading environment, it may be helpful to define a few terms including global text macro, variable, dialog, control, symbolic constant, state, and event used to describe the ERE application software. These terms and other terms are then used to further illustrate the exemplary reading environment.

Global text macros may include unique terms, terms which have different meanings for different parties, or terms which might be inherently ambiguous in the English language. Global text macros are set off by the exclamation mark. For example, a global text macro might look like the following: !term!.

Variables are used to denote values in ERE which may change during the time the program is in use. These changes are usually in response to user action. Variables are set off by the dollar sign. For example, a variable might look like the following: $variable$.

Dialogs are used to describe windows in ERE, and refer to a screen shot. Dialogs are set off by the angle brackets. For example, a dialog might look like the following: <dialog>.

Controls are used to describe specific controls within a dialog, and might refer to a numbered item on a screen shot. Controls are set off by the percent sign. For example, a control might look like the following: % control %.

Symbolic constants are used for terms with associated values, often numeric. Symbolic constants are set off by the number sign. For example, a symbolic constant might look like the following: #constant#.

States are used to define the current application state. A state reflects the application's (i.e. ERE's) current mode of interaction with the user, that is, a state describes what the user perceives the application's current situation to be. States are set off by the ampersand. For example, a state might look like the following: &state&.

An event is an action within the system, initiated and performed either by the user or by the system in response to a previous event. The event formalism is used to define and refer to these actions in the context of lists and tables. Events are set off by the commercial "at" symbol. For example, an event might look like the following: @event@.

Lists are used to define and describe the combinations of states and events possible in the application being developed. Lists are indented by one tab for each successive item in the hierarchy. For example, a. hierarchy might include <dialog>, % control %, &state&, @event@, consequence. The hierarchy might then look something like this:

Dialog: <Dialog>
      Control: % Control %
        State: &State1&
          Action: @Event1@ on control
            Consequence1
          Action: @Event2@ on control
            Consequence2
        State: &State2&
          Action: @Event1@ on control
            Consequence1
          Action: @Event2@ on control
            Consequence3

Referring back to FIG. 2, the display of the exemplary main document 112 might have the following list: [I assume this is drawn verbatim from the ADS?]

Dialog: <Document_Display>
      Control: % Display_Window %
        State: &default_state&
          Event: @no_event@
            Consequence: @display_document ($current_document$)@
        State: &default_state&
          Event: @select_text@
            Consequence: @select_access_point ($selected_text$)@
        State: &prompt_waiting&
          Event: @page_change@
            Consequence: @display_prompt ($current_page_prompt$)@
      Control: % Search_Button %
        State: &access_point_selected&
          Event: @single_click@
            Consequence: @search ($access_point$)@
        State: &defaultstate&
          Event: @single_click@
            Consequence: @display_error (#no_selection_error#)@
      Control: % Working_Space_Button %
        State: &defaultstate&
          Event: @single_click@
            Consequence: @launch_dialog (<Working_Space>)@
      Control: % Note_Tab_Button %
        State: &default_state&
          Event: @single_click@
            Consequence: @go_to_page($note_page$)@
      Control: % HomeButton %
        State: &default_state&
          Event: @single_click@
            Consequence: @display_document ($home_document$)@
      Control: % Retain_Button %
        State: &default_state&
          Event: @single_click@
            Consequence: @launch_dialog (<Reference>)@ with selected text or image to be retained
      Control: % Preferences_Button %
        State: &default_state&
          Event: @single_click@
            Consequence: launch a to-be-designed dialog which allows users to specify options such as colors, number of columns for text, eyetracking or alternative inputs, etc.
      Control: % Save_Path_Button %
        State: &default_state&
          Event: @single_click@
            Consequence: @save_path@

It should be noted that @single_click@ in the gray area in this dialog outside the document will result in a new % Note_Tab_Button % being displayed 122, 126, and 130 for the user to fill in and place as a reminder of useful data on this page.

Inputs may also include pen, eye tracking, or other devices, which will result in the same eventual outcomes as with mouse/keyboard. Pen input will enable the entry of "marginalia," such as manual underlining and circling of text, and handwritten text, on the image of any page in any document.

Referring back to FIG. 3, the display of the exemplary access point search result and database search menu 162 might have the following list:

Dialog: <Search_Results>
      Control: % Dictionary_Link %
        State: &default_state&
          Event: @single_click@
            Consequence: @display_document ($current_dictionary_document$)@
      Control: % Encyclopedia_Link %
        State: &defaultstate&
          Event: @single_click@
            Consequence: @display_document ($current_encyclopedia_document$)@
      Control: % Database_Link %
        State: &default_state&
          Event: @single_click@
            Consequence: @display_document ($current_database_document$)@
      Control: % WWW_Link %
        State: &default_state&
          Event: @single_click@
            Consequence: @display_document ($current_WWW_document$)@
      Control: % Query_Text %
        State: &default_state&
          Event: @keyboard_entry@
            Consequence: @set_query_text_contents ($keyboard_entry_data$)@
      Control: % Search_Button %
        State: &default_state&
          Event: @single_click@
            Consequence: @search($query_text_contents$)@

Referring back to FIGS. 4 and 5, the display of the exemplary route map 182 an 184 might have the following list:

Dialog: <Route_Map>

Control: % Node %
   State: &default_state&
      Event: @mouse_over@
         Consequence: @display_document_title@
      Event: @single_click@
         Consequence: @recenter_mapper($Node_id$)@
         @display_document($Node_content$)@
Control: % Expand_box %
   State: &default_state&
      Event: @single_click@
         Consequence: @change_child_display@

Referring back to FIG. 6, the display of the exemplary working space 204 might have the following list:

Dialog: <Working_Space>
Control: % NoteTitleText %
   State/Event/Consequence: Functions as system default, data stored in $title$
Control: % Priority_Combo %
   State/Event/Consequence: Functions as system default, selection stored in $priority$
Control: % Save_Button %
   State: &default_state&
      Event: @single_click@
         Consequence: save_working_space ($title$, $priority$)@
         Consequence: Place a new % Note_Tab_Button % in the <Document_Display> window to allow user to locate the note on the document margin Referring back to FIG. 7, the display of the exemplary reference 228 might have the following list:

Dialog: <Reference>
Control: % OK_Button %
   State: &default_state&
      Event: @single_click@
         Consequence: @save_reference_text@

It should be noted that this window preferably remains visible once launched, even as the user changes pages in the document being viewed. It only closes when the OK or Cancel button is clicked.

Referring back to FIG. 8, the display of the exemplary collaboration area 244 might have the following list:

Dialog: <Collaboration_Area>
Control: % Whiteboard_Textarea %
   State: &default_state&
      Event: @no_event@
         Consequence: @display_collaboration@
      Event: @keyboard_entry@
         Consequence: @add_to_collaboration($keyboard_entry_data$)@
      Event: @mouse_entry@
         Consequence: @add_to_collaboration($mouse_entry_data$)@
Control: % Users_Select_Multiple %
   State: &default_state&
      Event: @double_click@
         Consequence: @launch_dialog(<Private_Message>, $selected_user$)@
Control: % Group_Chat_Textarea %
   State: &default_state&
      Event: @no_event@
         Consequence: @display_conversation@
Control: % Comment_Entry_Textarea %
   State: &default_state&
      Event: @keyboard_entry@
         Consequence: @set_comment_textarea_contents ($keyboard_entry_data$)@
Control: % Send_Button %
   State: &default_state&
      Event: @single_oliok@
         Consequence: @send_comment ($comment_textarea_contents$)@
Control: % Log_Off Button %
   State: &default_state&
      Event: @single_click@
         Consequence: @log_off@
Control: % Save_Button %
   State: &default_state&
      Event: @single_click@
         Consequence: @save_collaboration@

Referring back to FIG. 9, the display of the exemplary instructor prompt 276 might have the following list:

Dialog: <Prompt>
Control: % Submit_Button %
   State: &default_state&
      Event: @single_click@
         Consequence: @save_prompt@

Referring back to FIG. 10, the display of the exemplary private message with user 296 might have the following list:

Dialog: <Private_Message>
Control: % Dialog_Display_Window %
   State: &default_state&
      Event: @no_event
         Consequence: @display_conversation@
Control: % Comment_Entry_Textarea %
   State: &default_state&
      Event: @keyboard_entry@
         Consequence: @set_comment_textarea_contents ($keyboard_entry_data$)@
Control: % Send_Button %
   State: &default_state&
      Event: @single_click@
         Consequence: @send_comment ($comment_textareacontents$)@

Referring back to FIG. 11, the display of the exemplary system administration 312 might have the following list:

Dialog: <Admin_System>
Control: % Add_New_Database_Button %
   State: &default_state&
      Event: @single_click@
         Consequence: @launch_dialog (<Admin_Add_Database>)@
Control: % Delete_Database_Button %
   State: &default_state&
      Event: @single_click@
         Consequence: @delete_databases ($selected_databases$)@
Control: % Add_New_Search_Engine_Button %
   State: &default_state&
      Event: @single_click@
         Consequence: @launch_dialog (<Admin_Add_Search_Engine>)@
Control: % Delete_Search_Engine_Button %
   State: &default_state&
      Event: @single_click@
         Consequence: @delete_search_engines ($selected_search_engines$)@

Referring back to FIG. 12, the display of the exemplary add database 328 might have the following list:

Dialog: <Admin_Add_Database>
Control: % OK_Button %
   State: &default_state&
      Event: @single_click@

Consequence: @add_new_database ($database_name$, $database_location$)@

Referring back to FIG. 13, the display of the exemplary add search engine 340 might have the following list:
Dialog: <Admin_Add_Search_Engine>
Control: % OK_Button %
State: &default_state&
Event: @single_click@
Consequence: @add_new_search_engine ($search_engine_name$, $search_engine_location$)@

Referring back to FIG. 14, the display of the exemplary document administration 352 might have the following list:
Dialog: <Admin_Document>
Control: % Prompt_Active_Select_Multiple %
State: &default_state&
Event: @double_click@
Consequence: @launch_dialog (<Admin_Edit_Prompt>, $prompt_id$)@
Control: % Add_New_Prompt_Button %
State: &default_state&
Event: @single_click@
Consequence:@launch_dialog (<Admin_Add_Prompt>)@
Control: % Delete_Prompt_Button %
State: &default_state&
Event: @single_click@
Consequence: @delete_prompts ($selected_prompts$)@

Referring back to FIG. 15, the display of the exemplary add prompt 380 might have the following list:
Dialog: <Admin_Add_Prompt>
Control: % OK_Button %
State: &defaultstate&
Event: @single_click@
Consequence: @add_newprompt ($prompt_text$, $prompt_location$)@

Referring back to FIG. 16, the display of the exemplary edit prompt 400 might have the following list:
Dialog: <Admin_Edit_Prompt>
Control: % OK_Button %
State: &default_state&
Event: @single_click@
Consequence: @modify_prompt ($prompt_id$, $prompt_text$, $prompt_location$)@

As described above, the electronic reading environment may be used by multiple people undertaking the same basic task at the same time, so preferably a client/server is utilized. In client/server computing there may be one (or several) centralized server computer(s) which is utilized for data storage and task assignment among the many client systems. The parallel is easy to draw in this case, allowing us to easily designate the tasks to be completed by the servers.

Information about each student, client computer, task, as well as general configuration options, is preferably stored in a database on the server. The database preferably allows any student to use any electronic reading system and immediately have access to all of his or her previous work by storing and updating this information on the central server. Additionally, by having all progress and activities completely synced with the central server, an instructor or administrator can in effect track the movements of any or all students using the electronic reading systems, and through a messaging or signaling protocol, interact with them (using the private messaging functionality discussed above). As part of this tracking of student progress through a central database, an administrator can generate progress reports and summary reports of individual students as well as of how the multiple students fared on a given assignment.

For the electronic reading systems, storing data on a central server is preferably transparent to the user. Using an SQL-compliant database on the server allowing TCP/IP connections, as nearly all databases do, the clients would merely perform all storage tasks by way of SQL inserts, and retrieve all needed information, including overall assignments, instructor prompts, and previous path history, by way of SQL select statements. Under this implementation the user would not necessarily be aware of the underlying client/server architecture in which the electronic reading system exists. According to the exemplary embodiment, the systems and servers are connected to a local area network (LAN), which may include wired or wireless networking.

An additional real time protocol, in addition to database storage, is needed to allow the private messages between instructor and student, and potentially even between students. For this messaging functionality a combined signaling/messaging protocol is preferably implemented, using a single TCP/IP port to receive all messaging data. Messaging is broken down into signaling and the actual content of messages to reflect the dual nature of a message, that is its contents and its more semantic identifying data. However, an appropriately designed protocol allows both types of data to be transmitted over the same port. This messaging protocol may also be designed in a client/server manner. A message, originating at a client system (including an administrator system) is passed to the server along with the semantic information of the recipient and any other attributes (for example, a notion of importance or urgency). The server computer may then log this message into the database for later retrieval and determines the correct address to send the message to, completing the exchange. Reply messages are handled in exactly the same manner. This client/server messaging protocol preferably removes the possibility of a "spoofed" message by requiring the server to vouch for the identity of both the sender and recipient.

The client/server architecture of the electronic reading system may then give security and flexibility to the clients themselves, while at the same time allowing administrators the ability to easily keep track of clients and access relevant data to each assignment. This functionality allows the broadest freedom to both types of users of the electronic reading environment due to its centralized, easily accessed data storage and secure messaging. In addition, the location of all important data in a single location allows for easier back-up and maintenance.

The exemplary embodiments described herein disclose a device, system, and method for providing an electronic reading environment. The electronic reading environment is preferably designed to help people reading text in electronic form by deploying electronic aids to make reading more efficient, to improve reader comprehension, and to enable the exploration of related information and additional sources. The electronic reading environment creates an environment within which any electronic text may be read, and preferably equips that environment with powerful search engines and navigational aids.

Imagine reading a document or other body of text in electronic form, whether the text is a course document for school, a work of literature, a business plan, a poem, a newspaper or magazine article, or a web page. The electronic reading environment provides the means for reading that document. In this environment, one can search the document for most if not all of the words, phrases, or quotations, each referred to as an "access point," in a dictionary, an encyclopedia, and in one or more of the other databases accessed by ERE. Once an access point is selected, a search engine is preferably deployed that locates additional sources of information related to the access point you selected. The reader can use these and search other additional sources or documents. This process can continue for any number of iterations.

As the reader's exploration of related information leads away from the original document to other sources, and to sources related to these sources, navigational aids can be activated to assist the exploration and reduce cognitive load. Hardship often associated with reading electronic text, searching electronic databases, and browsing the Internet is preferably reduced.

Paper pages and books have a number of advantages when compared to existing means of reading electronic text, however, these advantages are preferably adapted to the electronic reading environment.

The reader is preferably given all the information he or she needs, at just the right time. Behind any text lies the entire body of human knowledge. This knowledge is of no use unless it is related to a reader's current interests and needs. In other words, give the reader the information he or she needs right now to understand what they are reading.

ERE enables knowledge creation. Preferably, every text is a window through which a reader can "reach" for connections and relationships to other information. Reading electronic text, instead of paper text, allows you to leverage the benefits of computer technology to increase your ability to understand information and create new knowledge. Computers allow us to increase human memory and processing speed so that more of the world can be brought into view as any given text is read. By facilitating the use of electronic text, and the concurrent exploration of related information and resources, the present embodiments might actually enable knowledge creation, instead of merely increasing the efficiency of accessing or moving existing knowledge.

Preferably, the present embodiments is not expensive to develop and is likely to be very cost-effective for users, is scalable as new features become available to increase functionality, and can be designed to work with any text the user encounters. Most important, all of the capital-intensive infrastructure and hardware development that will make ERE attractive will be done by other parties, including hardware manufacturers, electronic publishers, and bandwidth providers. In other words, costly and complex issues like screen resolution, the reduction of hardware size, processing speed, conversion of paper resources into electronic format, mobile computing, and bandwidth are already being tackled by others.

It should be understood that the programs, processes, methods and systems described herein are not related or limited to any particular type of software or hardware, unless indicated otherwise. For example, the ERE is not necessarily limited to running as application software, but could be performed via hardware, software (operating system or application level), or both (hardware and software). Various types of general purpose or specialized electronic reading environments may be used in accordance with the teachings described herein. Furthermore, the screen shots illustrating the various screen-shots are exemplary only, and may also be implemented using a Microsoft Windows, Linux, or other operating system based interface, such as is known in the art.

In view of the wide variety of embodiments to which the principles of the present embodiments can be applied, it should be understood that the illustrated embodiments are exemplary only, and should not be taken as limiting the scope of the present invention. For example, more or fewer elements may be used in the figures.

The claims should not be read as limited to the described order or elements unless stated to that effect. Therefore, all embodiments that come within the scope and spirit of the following claims and equivalents thereto are claimed as the invention.

What is claimed is:

1. A method of assisting in the assimilation of electronic information, the method comprising:
    selecting a portion of an electronic document that is to remain visible to a user;
    generating a window that displays the selected portion of the electronic document;
    converting the electronic document into a hyper-document so that each word in the hyper-document comprises an access point;
    selecting a first access point from the hyper-document;
    performing a first electronic search in response to selecting the first access point;
    selecting a second access point from search results provided by the first electronic search;
    generating a map that graphically represents a user-guided exploratory path from the first access point to the second access point;
    performing a second electronic search in response to selecting the second access point;
    selecting a third access point from search results provided by the second electronic search; and
    updating the map so that the map is shaped by a user-guided exploratory path from the first access point to the second access point to the third access point so as to only indicate the search results that the user has viewed.

2. The method of claim 1 further comprising the step of:
    storing retained references in the window.

3. A method of simulating paper-based text in an electronic environment, the method comprising:
    converting an electronic document into a hyper-document in order to provide a first access point;
    displaying the electronic document;
    a user marking the electronic document, wherein marking includes writing electronic textual notes on the electronic document;
    maintaining an accessible view of the marked document so that the marked document may be brought into view at any point during an exploratory search;
    exploring the first access point by using an electronic reference source to return a second electronic document that is related to the first access point; and
    graphically relating the marked document, the second electronic document, and electronic documents subsequently returned by further exploring in a manner that allows the user to view relationships between all of the electronic documents and to return to any of the electronic documents.

4. The method of claim 3 wherein the step of marking the electronic document includes entering marginalia.

5. The method of claim 3 wherein the step of marking the electronic document-comprises retaining information for display.

6. The method of claim 3 further comprising the step of:
    electronically searching the marked electronic document.

7. The method of claim 3 further comprising the step of:
    providing a real-time textual and graphical collaboration between a plurality of users.

8. A method of assisting in the assimilation of electronic information, the method comprising:
- promoting a user's focus on a main electronic document by:
  - (i) converting the main document into a hyper-document, wherein the conversion creates a first access point that leads to a plurality of access points within a plurality of electronic documents;
  - (ii) receiving a first user annotation related to the main document;
  - (iii) storing the first user annotation on the main document in a graphical manner; and
  - (iv) graphically displaying the main document during a user's exploratory search away from the main document; and
- supporting the user's exploratory search away from the main document by:
  - (i) providing the first access point in the main document;
  - (ii) upon selection of the first access point, creating in real-time a route map that is centered on the main document;
  - (iii) upon selection of the second access point, updating the route map, wherein the route map provides access to the first access point and every electronic document previously accessed in the exploratory search;
  - (iv) receiving a second user annotation related to the second access point; and
  - (v) storing the second user annotation on the second document in a graphical manner.

9. The method of claim 8, wherein graphically displaying the main document comprises:
- providing a retain button, wherein the user clicks the retain button to restore a portion of the main document.

10. The method of claim 8, wherein the first access point is a word.

11. The method of claim 8, wherein the first access point is a phrase.

12. The method of claim 8, wherein the first and second user annotations are markings selected from the group consisting of tabbing, underlining text, highlighting text, circling text, making notes, and drawing an image.

13. The method of claim 8, wherein the second access point is located in a second electronic document.

14. The method of claim 8, wherein the route map provides a node for each previously accessed electronic document and the main document.

15. The method of claim 14, wherein each node is accessible by a single link, thereby providing the user access to each previously accessed electronic document and the main document.

16. The method of claim 15, wherein a length associated with each single link is a function of a discovery distance away from the main document.

17. The method of claim 16, wherein the route map is orbital, and wherein the main document is at a center of the orbital route map.

18. The method of claim 8, wherein supporting the exploratory search away from the main document further comprises:
- when the user selects the second access point, returning a second plurality of access points within a second plurality of electronic documents.

19. The method of claim 18, wherein supporting the exploratory search away from the main document further comprises:
- if the user selects a third access point from the plurality of access points, updating the route map.

20. The method of claim 8, wherein the main document is an electronic image.

21. The method of claim 8, wherein the first access point leads to the plurality of access points within a plurality of electronic documents by conducting an electronic dictionary lookup and returning the plurality of electronic documents.

22. The method of claim 8, wherein the first access point leads to the plurality of access points within a plurality of electronic documents by conducting an electronic encyclopedia lookup and returning the plurality of electronic documents.

23. The method of claim 8, wherein the first access point leads to the plurality of access points within a plurality of electronic documents by conducting a web search and returning the plurality of electronic documents.

* * * * *